April 9, 1968 R. H. WESLEY 3,376,633
BALL JOINT FORMING METHODS
Filed April 20, 1966 2 Sheets-Sheet 1
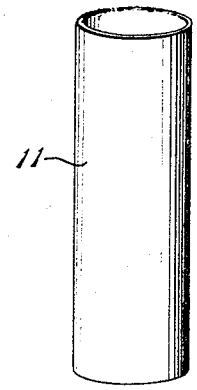
Fig. 2-A
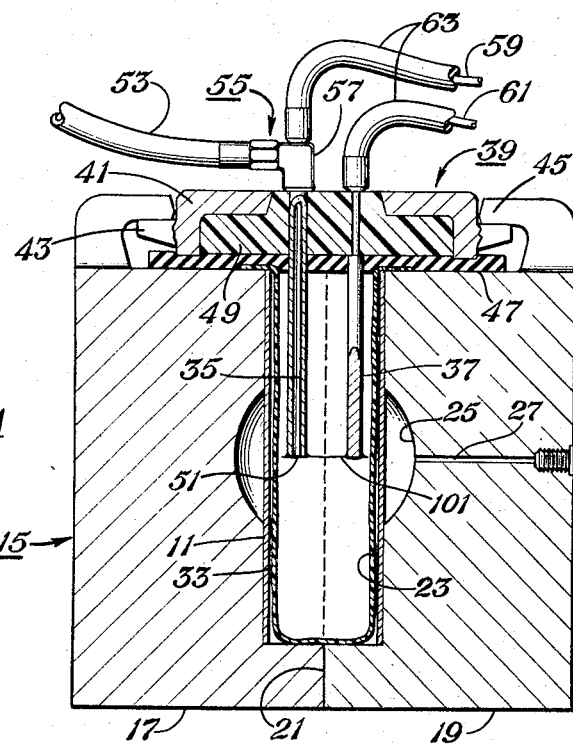
Fig. 1-A
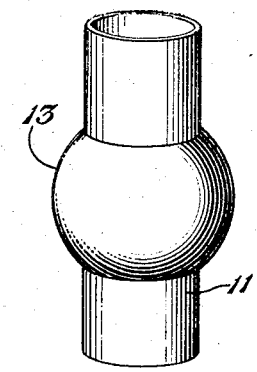
Fig. 2-B
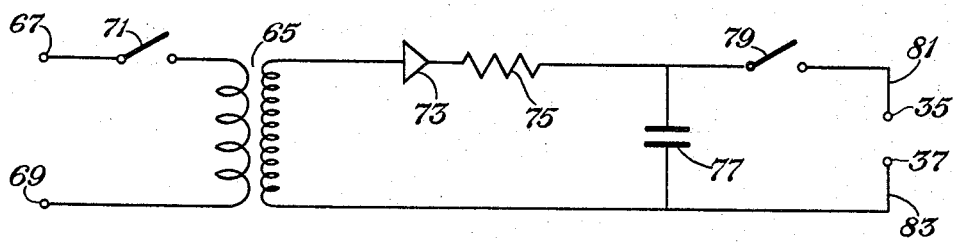
Fig. 1-B
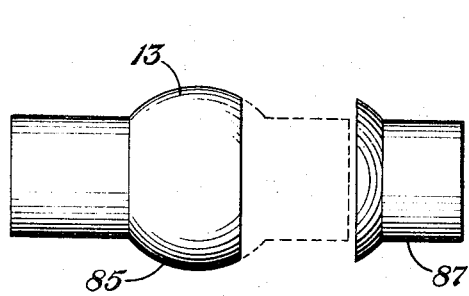
Fig. 2-C
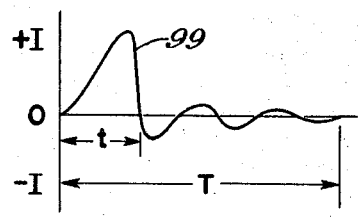
Fig. 12
INVENTOR
Richard H. Wesley
BY
Wofford & Felsman
ATTORNEYS April 9, 1968  R. H. WESLEY  3,376,633
BALL JOINT FORMING METHODS
Filed April 20, 1966  2 Sheets-Sheet 2
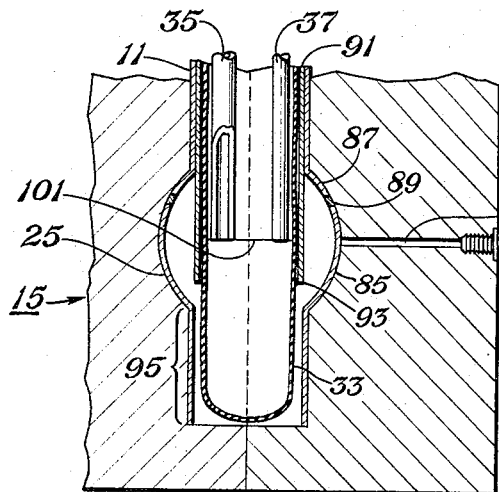
Fig. 3
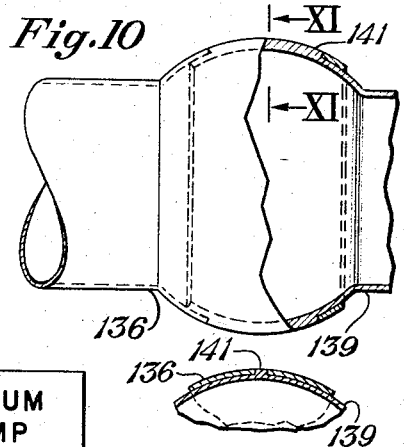
Fig. 10
Fig. 11
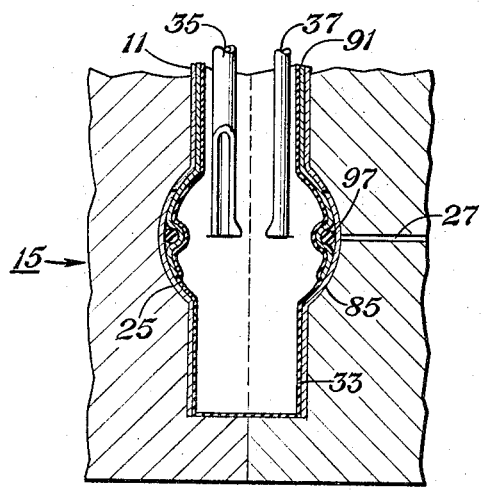
Fig. 4
Fig. 5
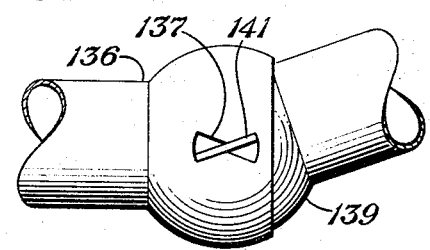
Fig. 9
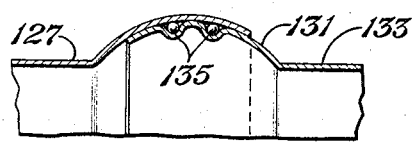
Fig. 8
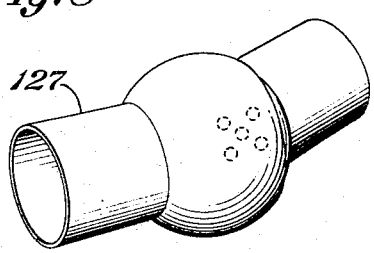
Fig. 7
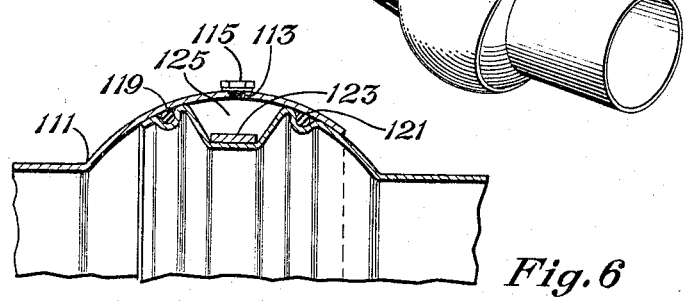
Fig. 6
INVENTOR
Richard H. Wesley
BY
Wofford & Felsman
ATTORNEYS

United States Patent Office 3,376,633
Patented Apr. 9, 1968

3,376,633
BALL JOINT FORMING METHODS
Richard H. Wesley, 3709 Echo Trail,
Fort Worth, Tex. 76109
Filed Apr. 20, 1966, Ser. No. 543,985
12 Claims. (Cl. 29—421)

My invention relates in general to the manufacture of ball joints and in particular to improved methods for forming seal-tight ball joints.

There are a number of industries which require tubular ball joints capable of transferring, without leakage, a fluid from one location to another. In chemical plants and petroleum refineries, for example, vibrations of the machinery often necessitate the use of conduits having tubular ball joints at selected regions along their length to prevent fatigue failures.

Presently available ball joints that can withstand high fluid pressures are generally expensive, because certain regions of them are machined. More inexpensive methods of manufacture have been attempted, but such methods have produced something less than satisfactory results.

It is the general object of my invention to provide an improved method for manufacturing seal-tight tubular ball joints.

Another object of my invention is to provide an improved method for manufacturing tubular seal-tight ball joints in which a resilient seal means is retained between the mating ball joint members during the deformation of the inner ball joint member.

Another object of my invention is to provide an improved method for forming hollow seal-tight ball joints in which a lubricant reservoir is formed between the ball joint members during the formation of the inner ball joint member.

Previously, attempts have been made to form tubular ball joint members by deforming the extremity of a thin-walled metal cylindrical tube into a spherical contour, and thereafter expanding the extremity of another thin-walled metal cylindrical tube while inside the spherical contour of the first tube. In this manner the second tube can be deformed until it has a spherical region that matches the spherical contour of the first tube. One problem with previous attempts of this type is that the metal of the inner or second tube has a quantity of "spring-back" that prevents it from sealingly engaging the outer or first tube. That is, if the metal forming method known as metal spinning is used, for example, to form the second or inner tube, the elasticity of the metal will cause it to shrink from its largest size. Thus, the first and second tubes will not tightly engage each other when completed in the form of a ball joint. This makes the problem of sealing the ball joint more difficult.

Moreover, it is essential in some instances that resilient sealing elements such as "O-rings" be provided between the first and second ball joint members. To provide a place to receive such sealing elements after forming the ball joint members is relatively difficult. To attempt to form the ball joint members around a resilient sealing element may result in excessive compression or rupture of the sealing element.

My ball joint manufacturing methods include the use of what may be called the "capacitor discharge method" which utilizes the discharge of a selected quantity of electric energy within a selected time interval through discharge elements positioned within the inner tubular member. The spherical region of the outer tubular member may be formed by any method, including the capacitor discharge method, but the spherical region of the inner tubular member must be formed by the capacitor discharge method, for the troublesome "spring-back" encountered when using other metal forming methods is essentially eliminated or effectively reduced. Thus, the spherical region of the inner tubular member tightly engages the spherical region of the outer tubular member, enabling the provision of a seal-tight ball joint.

Moreover, by using the capacitor discharge method, resilient sealing elements such as O-rings may be retained between the mating ball joint members by forming the inner tubular member around them. Surprisingly, the resilient and relatively soft sealing element is not ruptured, or excessively compressed or permanently deformed during the discharge of large quantities of energy, even though the metal around it may be tortuously deformed. While the above phenomenon cannot as yet be fully explained, I know that the time interval of discharge of the electrical energy is a significant factor. The shorter the time interval, the less is the permanent deformation occurring in the resilient sealing element. I, therefore, am led to believe that the fast moving metal forms around the sealing element before it has time to substantially deform, but a completely satisfactory explanation is not yet known by me. My method will become more apparent in the detailed description where I further explain the invention and its applications.

The above and other objects are effected by my invention as will be apparent from the following description, taken in accordance with the accompanying drawings, forming a part of this application, in which:

FIG. 1–A is an elevational view in partial and fragmentary longitudinal section showing apparatus that may be used in practicing my ball joint manufacturing methods;

FIG. 1–B is a schematic electrical diagram showing a power unit that is suitable for use with the FIG. 1–A apparatus;

FIG. 2–A is a perspective view of a hollow tubular member used in my ball joint manufacturing method;

FIG. 2–B is a perspective view of the tubular member of FIG. 2–A after a spherical enlarged portion has been formed thereon;

FIG. 2–C is a side elevational view of the tubular member shown in FIGS. 2–A and 2–B after its spherical portion has been truncated;

FIG. 3 is an elevational view in fragmentary longitudinal section showing a second tubular member positioned within the die means and the first tubular member;

FIG. 4 is an elevational view in partial and fragmentary longitudinal section, after the expansion of its extremity into mating engagement with the spherical region of the first tubular member;

FIG. 5 is a perspective view showing a completed tubular seal-tight ball joint;

FIG. 6 is a fragmentary longitudinal section view of a ball joint manufactured in accordance with the principles of my method and having formed therein a lubricant reservoir;

FIGS. 7 and 8 are respectively a perspective view and a fragmentary longitudinal section view of a modified form of ball joint.

FIG. 9 is a side elevational view of a ball joint in a modified form which is capable of transmitting torque;

FIG. 10 is a side elevational view in partial section of the outer ball joint member shown in FIG. 9;

FIG. 11 is a cross-sectional view as seen looking along the lines XI—XI of FIG. 10; and FIG. 12 is a diagram which indicates the variation in discharge current in a short interval of time after discharge of the capacitors.

Initially, a first tubular member 11 (see FIG. 2–A) is formed to have a spherical, enlarged portion 13 thereon, as shown in FIG. 2–B. As previously mentioned, this step of the method may be accomplished with a number of known methods or, alternatively, may be formed by inserting the first tubular member 11 into a die means 15 as shown in FIG. 1–A. The die means may be divided into two pieces 17, 19, with the dividing line being indicated by the numeral 21. The pieces 17, 19, of the die means cooperate to form a cylindrical portion 23 that merges into an enlarged spherical portion 25. An aperture 27 extends from the approximate midsection of enlarged spherical portion 25 and a fastener means 29 connects this aperture with a conduit 31 and thereby with a vacuum pump 32 which is used to evacuate the die, as will be explained in the operational description.

Seal means 33, here a thin-wall rubber bag, is inserted inside the first tubular member 11. Inserted inside seal means 33 is a pair of electrodes 35, 37, which extend through a suitable retainer means 39 that is removably secured to the die means 15. The retainer means 39 in this instance has a rotatable metal cap 41 with a plurality of radially protruding wings 43 secured thereto. These wings 43 may be inserted into vertically extending slots (not shown) in the inwardly protruding shoulders 45 of the die means and rotated until they are jammed thereunder. Thus, the locking means operates in the manner of a break lock. A resulting downward movement of the cap results, forcing it into a sealing pad 47, preferably made of rubber, which prevents fluid flow from the upper end of the first tubular member 11. The seal means 33 is also sealingly engaged by the sealing pad 47, as may be seen in FIG. 1–A.

Although not shown in the drawings, sealing elements are provided between the mating pieces 17, 19 and exterior to the cylindrical and spherical portions 23, 25 of the die means to prevent fluid ingress or egress except through the designated flow conduits. Also, suitable clamping means (not shown) are provided to force the mating pieces of the die means 25 together.

An interior region 49 of the retainer means 39 is made of a relatively hard but resilient material such as hard synthetic rubber or plastic and receives the electrodes 35, 37. This interior region 49 is beneficial in absorbing the shock waves generated upon discharge of electrical energy across the electrodes.

Extending longitudinally through electrode 35 is an aperture 51 which is connected with a liquid conduit 53 by suitable fastener means 55. A portion 57 of fastener means 55 may be formed of an electrically nonconductive material to help electrically insulate the electrode 35 from the liquid conduit 53. In this regard note that the electrically conductive wires 59, 61 may be insulated, as is indicated by the numeral 63.

A typical electrical power unit is shown in FIG. 1–B. This power unit includes a transformer 65, the primary winding of which may be connected at terminals 67, 69 to a source of alternating current via a suitable switch 71. The secondary winding of the transformer 65 is connected in series with a suitable rectifier 73, a current limiting resistor 75, and a capacitor bank 77. The capacitor bank 77 is connected in series with a second switch 79 and the electrodes 35, 37 by means of the electrical conductors 81, 83.

In using the above-described apparatus the first tubular member 11 is inserted within the die means 15. The seal means 33 is inserted inside the first tubular member 11 and the retainer means, including its interior region 49 and the sealing pad 47, are moved over the upper open end of the first tubular member and lowered until electrodes 35, 37 are in the approximate midsection of the enlarged spherical portion 25 of the die means. Then the retainer means 39 is rotated until the outwardly protruding wings 43 thereof are forcefully engaged and urged downwardly by the inwardly protruding shoulders 45.

A liquid such as water is introduced from a suitable source (not shown) through conduit 53 and through the aperture 51 of electrode 35 into the interior of the seal means 33 to generally fill it with water. Next, the space between the first tubular member and the die means is evacuated by vacuum pump 32.

Then, a selected quantity of electric energy is discharged across the electrodes 35, 37 inside the die means. To achieve an electrical discharge with the apparatus shown in the drawings, the switch 71 (see FIG. 1–B) is first closed and a quantity of electrical energy stored within the capacitor bank 77. Then switch 79 is closed and a quantity of electric energy discharged across the electrodes 35, 37. The primary factors involved in the production of effective and satisfactory electric energy discharge effects in the above apparatus are: the quantity of stored electric energy released during each energy discharge or impulse; and the accompanying electric current discharged; the time interval of discharge of the energy. The resulting high intensity steep wave front shock wave generated in the pressure transmitting liquid forces the first tubular member into the enlarged spherical portion 25 of the die means, resulting in the deformation of the first tubular member 11 into the shape illustrated in FIG. 2–B.

As shown in FIG. 2–C, the first tubular member 11, after it has been deformed to have the enlarged spherical portion 13 thereon, is truncated by cutting it with suitable means such as a saw (not shown) along a plane perpendicular to the longitudinal axis of the first tubular body to form a larger segment 85 and a smaller segment 87. Then, the smaller and larger segments 87, 85 are inserted in the die means 15, as illustrated in FIG. 3. Since the saw blade or other implement used to perform the truncating step will have some ascertainable width, it is beneficial to insert an annular shim 89 into the resulting gap so that there will be no void space along the interior surface of first tubular member 11 after it has been reinserted into the die means 15.

Alternatively, two first tubular members 15 may be formed and each of them cut in a manner to compensate for the width of the saw blade so that when the smaller segment 87 of one tubular member is assembled with the larger segment 85 of the other tubular member, they engage without leaving a void space and without necessity for using a shim.

Another alternative is to use a second die means that is machined to have a recess that receives the larger spherical segment 85 of the first tubular member while having a portion of the die machined to appear as if a smaller spherical segment 87 were permanently formed therein.

A further alternative is to leave the first tubular member inside the die means before the truncating step and to form the second tubular member inside it. The truncating step can be performed later in the method and the smaller segment 87 removed.

By using any of the above four or other suitable alternatives, a die means for forming the second tubular member may be provided in a manner such that this tubular member will have a smooth exterior spherical surface that will move freely within the first tubular member. In other words, no ridges will be formed in the exterior surface of the inner tubular member.

When using any of the above described alternatives, the second tubular member 91 (see FIG. 3), being of small outer diameter by preferably a value twice the gauge of the metal than the inner diameter of the first tubular member, is inserted a selected distance into the enlarged spherical region of its die means and the first tubular member. The lowest extremity 93 of the second tubular member should be positioned lower than the largest diameter of enlarged spherical portion 13 of the first tubular member, but should not extend into the lower cylindrical region 95 of the first tubular member. The exact location of the lower extremity 93 of the second tubular member with respect to the first tubular member will determine the amount of movement the finished ball joint can have.

Next, a thin wall rubber seal means 33 is inserted inside the second tubular member 91 and the electrodes 35, 37 lowered therein generally in the manner previously described in connection with the formation of the enlarged spherical portion 13 on the first tubular member. Air may be evacuated from the die means by vacuum pump 32 prior to the discharge of current across the electrodes.

To insure the formation of a seal-tight ball joint, a seal means such as the resilient O-ring 97 shown in FIG. 4 may be inserted within the first tubular member 11 and retained at a selected location by suitable means such as interference fit. When electrical energy is discharged across the electrodes 35, 37, the seal means 33 and the second tubular member 91 are rapidly urged outward until the second tubular member assumes the contour of the inner surface of the first tubular member, as shown in FIG. 4. Surprisingly, the resilient O-ring 97 is not substantially nor permanently deformed if suitable energy levels are reached, even though the metal of the second tubular member 91 is deformed around it as shown in FIG. 4. One would think that the resilient member, being much softer than metal of the tubular members, would be permanently flattened by the generation of the large pressures and forces.

This surprising result is not completely understood, but is known to be related to the time interval of the electrical discharge. Referring to FIG. 12, the curve 99 represents the discharge current I in amperes as seen plotted against the discharge time in microseconds. The first portion of the curve that is produced in the time interval $t$ will be referred to as the "peak discharge time." The total time T of the electrical discharge is also indicated.

If the peak discharge time $t$ becomes greater than 300 microseconds within the ranges of energy and current specified above, the resilient seal means 97 will be permanently deformed to a detrimental extent during the formation of the second tubular member inside the first tubular member. The resulting force between the second tubular member and the first tubular member increases as the energy level increases, until finally, the ball joint cannot be easily flexed. While the peak discharge time should not be over substantially 300 microseconds, I have found that a practical range of the peak discharge time is from about 25 to 100 microseconds.

From the above it may be seen that the greater the rapidity of the electrical discharge, the less final deformation will occur in the resilient seal ring. The rubber or resilient seal means possibly does temporarily deform, but if such deformation occurs, the metal of the inner tubular member apparently assumes its final shape before the resilient seal means is initially deformed, allowing the seal means to spring back to its original shape within the formed annular metal cavity.

An example of data obtained during the successful formation of soft aluminum having a thickness of .032 inch around a resilient piece of rubber having a one-fourth inch diameter and a durometer hardness 70 Shore A is as follows:

The die cavity had a fluid volume capacity of 716 cubic inches and was filled with tap water. A filament having a diameter of .051 inch and being manufactured of aluminum was placed between steel electrodes. Electric energy amounting to 28 kilojoules and an initial discharge current of 88,000 amperes was discharged through said filament during a peak discharge time interval $t$ of 46 microseconds. The resilient material was only slightly compressed after removing the test pieces from the die and yet the aluminum was sealingly formed therearound. Using a peak discharge time $t$ of 90 microseconds while discharging 10 kilojoules of energy and 42,000 amperes of current into the die means results in excessive compression of the resilient seal means. Other tests indicate that a peak discharge time $t$ of more than about 300 microseconds while discharging less than about 7 kilojoules of energy in the above die means at a current of less than about 5,000 amperes produces something less than satisfactory results due to excessive resilient material compression and failure of the aluminum to properly form around the resilient material.

The above values will vary with the type, thickness and treatment of the metal and the composition and condition of the resilient material.

In connection with the above-described method for forming seal-tight ball joints, it should be understood that the method is not limited to the specific apparatus shown above. For example, the seal means 33 that is used to confine the liquid within a selected region of the die means and thereby to permit the evacuation of air from the die means has been illustrated as being in the form of a thin walled rubber bag. This type of seal means has been used with satisfaction and is advantageous since it can be reused. However, a thin wall bag made of a material such as polyethylene has been used satisfactorily, but bags of this type rupture during the discharge of electric energy. Thus, a new bag must be used for each electrical discharge.

There are a large variety of die means that may be used in practicing the invention. The retainer means 39 has been found satisfactory, but there are other ways that the problem of providing satisfactory retainer means can be approached. For small diameter tubes (for example, one-half inch or less) where it is impracticable to insert electrodes, a reflection chamber equipped with electrodes and communicating with the interior of the tubular member may be used.

In FIG. 1-A is illustrated a filament 101 that is made of an electrically conductive material. The use of such filaments is sometimes advantageous but is not essential to the practice of the method since it is found that the use of electrodes 35, 37 with their extremities formed slightly inward can be used satisfactorily (see FIG. 4).

Also, in the above-described method, it should be understood that the outer tubular member can be formed with other satisfactory methods, as for example, metal spinning and "Hydroforming." In such other methods, the metal "springs" back from its largest diameter since commonly the metal is stretched below its yield point. This spring back would not be detrimental on the first tubular member, however, since once it is inserted into the die means 15 the second tubular member can be made to conform to the first tubular member irrespective of whether or not the first tubular member was subjected to such spring back during its manufacture.

It should be apparent from the above that I have provided an invention having significant advantages. My method enables the formation of a ball joint which can be conveniently sealed because spring back of the metal pieces is effectively reduced. By discharging electrical energy within the energy levels and time periods specified above, a resilient seal means such as an O-ring may be placed between the second and first tubular members and the metal of these tubular members formed therearound in a manner such that the O-ring is not excessively compressed or deformed. This enables the effective formation of a seal and enables the ball joint to be flexed with an amount of force that is not excessive.

There are a number of forms that the ball joints may take when utilizing my method for forming seal-tight ball joints. FIG. 6 illustrates, for example, a seal-tight ball joint which has a lubricant reservoir formed therein to reduce the friction between the tubular members during use. The first or outer tubular member 111 has formed at approximately its largest diameter a threaded aperture 113 which receives a seal plug 115. The inner or second tubular member 117 is formed around two resilient O-rings 119, 121 which are spaced on opposite sides of a relatively inflexible, preferably steel, band 123 that is located at the approximate midsection of the enlarged spherical portion of the two members. This steel band is positioned around the inner tubular member prior to the discharge of the electric energy. Thus, the second tubular member forms around the O-rings and around the relatively inflexible band 123, leaving a sealed lubricant reservoir 125. This reservoir may be filled with any suitable lubricant and will therefore lubricate the mating surfaces of the first tubular member 111 and the second tubular member 117. The provision of seal plug 115 permits convenient replenishment of the lubricant. The lubricant may be of the self-sealing type. If so, the seal rings 119, 121 may be eliminated in some instance.

FIGS. 7 and 8 show a seal-tight ball joint formed by my method which is provided with bearing means to reduce the friction between the members. The first tubular member 127 is formed with its enlarged spherical portion 129 thereon and the enlarged portion 131 of the second tubular member 133 is formed around a plurality of steel balls 135, which are retained in indentations on a partially expanded inner tubular member by an adhesive having lubricating properties prior to final expansion of the second tubular member. The steel balls are arranged in a satisfactory pattern as shown in FIG. 7. Preferably, two such patterns of steel balls are formed at one-hundred-eighty degrees from each other and, therefore, easier rotation or flexure of the ball joints may be obtained due to the reduction in the friction between the first and second tubular members. It should be understood that resilient seal means may be provided in the device of FIGS. 7 and 8 and also, a lubricant reservoir of the type shown in FIG. 6 may be provided.

FIGS. 9, 10 and 11 show another form of seal-tight ball joint manufactured by my method. As may be seen in FIG. 9, the outer or first tubular member 136 has an hourglass shaped aperture 137 formed in at least one region thereof, and the inner or second tubular member 139 has a protrusion 141 that is rectangular in cross section and that extends from its outer surface into the hourglass shaped aperture 137. The inner tubular member 139 is expanded by an electric energy discharge in accordance with the principles of my invention so that the protrusion 141 extends upwardly through the aperture 137 previously formed in the outer tubular member 136. Removable fragmented pieces (not shown) are inserted within the hourglass shaped aperture 137 and confined by the die means so that protrusion 141 assumes a rectangular cross sectional shape during its deformation by the capacitor discharge method. Thus, the engagement of the protrusion 141 and the hourglass shaped aperture 137 enable torque to be transmitted by the ball joint and at the same time allow the ball joint to be flexed. In this embodiment, seal means may be provided in the ball joint and the other modifications previously described may also be utilized.

The O-ring groove may be preformed in the spherical region 13 of outer tubular member 11 so that the inner tubular member 91 will have a smooth contour on the inside to help decrease turbulent flow of the fluids passing therethrough.

The seal means need not necessarily be of the O-ring type but can have a variety of forms. One other form for example may be "Teflon" tape with an adhesive backing that may be pressed against the inner surface of the outer tubular member. Such seals are effective in preventing fluid leakage and are not damaged by the discharge of electric energy. Energy levels of not less than about 5 kilojoules should be used when using such sealing means.

The above-described method of discharging electrical energy may be referred to as the hydraulic capacitor discharge method. It is also practicable to form the above-described ball joints with the magnetic metal forming method, which is a species of the capacitor discharge method described in the patent issued to George W. Harvey et al., U.S. Patent No. 2,976,907.

The foregoing disclosure and the showings made in the drawings are merely illustrative of the principles of this invention and are not to be interpreted in a limiting sense.

I claim:
1. A method for making seal-tight ball joints, said method comprising:
  (a) forming a first tubular member with a spherical, enlarged portion thereon;
  (b) truncating said spherical portion along a plane substantially perpendicular to the longitudinal axis of said first tubular body to form a larger and a smaller segment;
  (c) inserting one extremity of a second tubular member a selected distance inside the mouth of the larger segment;
  (d) confining said first and second tubular members within a suitable die means;
  (e) discharging within said second tubular member by the capacitor discharge method a quantity of electrical energy amounting to at least 5 kilojoules with said discharge taking place within a peak discharge period of not over 300 microseconds and with the initial discharge current being at least 5,000 amperes to form an outwardly bulging spherical region in said second tubular member that engages the interior of the truncated spherical region of said first tubular member.

2. The method defined by claim 1 wherein said peak discharge period is selected from a range that varies from 25 to 100 microseconds.

3. The method defined by claim 1 which further includes:
  (a) filling said second tubular member with a selected nongaseous fluid;
  (b) emersing electrodes in said nongaseous fluids; and
  (c) discharging said electrical energy across said electrodes.

4. The method defined by claim 3 wherein said peak discharge period is selected from a range that varies from 25 to 100 microseconds.

5. A method for making seal-tight ball joints, said method comprising:
  (a) forming a first tubular member with a spherical, enlarged portion thereon;
  (b) truncating said spherical portion along a plane substantially perpendicular to the longitudinal axis of said first tubular body to form a larger and a smaller segment;
  (c) inserting one extremity of a second tubular member a selected distance inside the mouth of the larger segment;
  (d) positioning an annular resilient seal means around a selected region on the interior surface of the spherical portion of said first tubular body in opposing relationship with a region of said second tubular member;
  (e) confining said first and second tubular members within a suitable die means;
  (f) discharging within said second tubular member by the capacitor discharge method a quantity of electrical energy amounting to at least 7 kilojoules, with said discharge taking place within a period of not over 300 microseconds and with the initial discharge current being at least 5,000 amperes to form an outwardly bulging spherical region in said second tubular member that engages the interior of the truncated spherical region of said first tubular member.

6. The method defined by claim 5 wherein said peak discharge period is selected from a range that varies from 25 to 100 microseconds.

7. The method defined by claim 5 which further includes:
  (a) filling said second tubular member with a selected nongaseous fluid;

(b) immersing electrodes in said nongaseous fluid; and (c) discharging said electrical energy across said electrodes.

8. The method defined by claim 7 wherein said peak discharge period is selected from a range that varies from 25 to 100 microseconds.

9. A method for making seal-tight ball joints, said method comprising;

(a) forming a first tubular member with a spherical, enlarged portion thereon;

(b) truncating said spherical portion along a plane substantially perpendicular to the longitudinal axis of said first tubular body to form a larger and a smaller segment;

(c) inserting one extremity of a second tubular member a selected distance inside the mouth of the larger segment;

(d) positioning an annular relatively inflexible band around a selected region of the spherical portion of said first tubular member;

(e) confining said first and second tubular members within a suitable die means;

(f) discharging within said second tubular member by the capacitor discharge method a quantity of electrical energy amounting to at least 7 kilojoules with said discharge taking place within a period of not over 300 microseconds and with the initial discharge current being at least 5,000 amperes to form an outwardly bulging spherical region in said tubular member that engages the interior of the truncated spherical region of said first tubular member; and (g) forming a plug means through the enlarged spherical portion of said first tubular member in the vicinity of said relatively inflexible band for the introduction or withdrawal of lubricant.

10. The method defined by claim 9 wherein said peak discharge period is selected from a range that varies from 25 to 100 microseconds.

11. The method defined by claim 9 which further includes:

(a) positioning annular seal means on each side of said relatively inflexible band;

(b) filling said second tubular member with a selected nongaseous fluid;

(c) immersing electrodes in said nongaseous fluid; and (d) discharging said electrical energy across said electrodes.

12. The method defined by claim 11 wherein said peak discharge period is selected from a range that varies from 25 to 100 microseconds.

References Cited

UNITED STATES PATENTS

| | | | |
|---|---|---|---|
| 3,092,115 | 6/1963 | Harvey | 29—421 |
| 3,131,467 | 5/1964 | Thaller et al. | 29—421 |
| 3,160,949 | 12/1964 | Bussey et al. | 29—421 |
| 3,167,122 | 1/1965 | Lang | 29—421 |
| 3,222,902 | 12/1965 | Brejcha et al. | 72—56 |
| 3,230,285 | 1/1966 | Monteil | 264—84 |

THOMAS H. EAGER, *Primary Examiner.*